(12) United States Patent
Frenkel

(10) Patent No.: US 8,998,221 B1
(45) Date of Patent: Apr. 7, 2015

(54) WHEELBARROW TIE ROD

(71) Applicant: Truper, SA de CV, Jilotepec (MX)

(72) Inventor: Moises Sheinberg Frenkel, Delegacion Miguel Hidalgo (MX)

(73) Assignee: Truper, SA de CV, Jilotepec (MX)

( * ) Notice: Subject to any disclaimer, the term of this patent is extended or adjusted under 35 U.S.C. 154(b) by 0 days.

(21) Appl. No.: 14/228,823

(22) Filed: Mar. 28, 2014

(51) Int. Cl.
*B62B 1/18* (2006.01)

(52) U.S. Cl.
CPC ........................................ *B62B 1/18* (2013.01)

(58) Field of Classification Search
CPC .......... B62B 1/18; B62B 1/183; B62B 1/186; B62B 1/20; B62B 1/202; B62B 1/206; B62B 1/208; B62B 1/22; B62B 1/24
USPC ............... 280/47.131, 47.17, 47.3, 47.31, 78, 280/645, 651, 652, 653, 654, 655, 47.33; 296/203.1, 204, 205; 180/271, 274
See application file for complete search history.

(56) References Cited

U.S. PATENT DOCUMENTS

| | | | |
|---|---|---|---|
| 2,253,288 A | 12/1940 | Lucchi | |
| 2,532,966 A * | 12/1950 | Thomas | 280/47.33 |
| 2,692,175 A | 10/1954 | Jacques | |
| 3,282,600 A | 11/1966 | Tonelli | |
| 3,604,753 A | 9/1971 | Couture | |
| 3,791,470 A * | 2/1974 | Baddorf et al. | 180/19.1 |
| 4,208,044 A | 6/1980 | Schoenfeld | |
| 4,431,211 A | 2/1984 | Carrigan | |
| 5,465,801 A | 11/1995 | Hoover | |
| 5,580,018 A | 12/1996 | Remmers | |
| D404,881 S | 1/1999 | Shuchart et al. | |
| D404,882 S | 1/1999 | Shuchart et al. | |
| D404,883 S | 1/1999 | Shuchart et al. | |
| D408,607 S | 4/1999 | Shuchart et al. | |
| D408,955 S | 4/1999 | Shuchart et al. | |
| 6,241,276 B1 | 6/2001 | Wilburn | |
| 6,554,301 B2 | 4/2003 | Scott et al. | |
| D487,833 S | 3/2004 | Parker | |
| 6,820,880 B2 | 11/2004 | Benton et al. | |
| D501,974 S | 2/2005 | Lawson et al. | |
| 6,886,838 B1 | 5/2005 | Zimmerman | |
| 6,991,251 B2 * | 1/2006 | Tomchak et al. | 280/653 |

(Continued)

FOREIGN PATENT DOCUMENTS

| | | |
|---|---|---|
| FR | 2620588 A1 | 3/1989 |
| GB | 2341160 A | 3/2000 |
| MX | 1796 | 5/2008 |

OTHER PUBLICATIONS

Prosecution history of corresponding U.S. Patent No. 7,748,723 including: Notice of Allowance dated Mar. 8, 2010; Amendment dated Dec. 9, 2009; Office Action dated Jun. 10, 2009.

(Continued)

*Primary Examiner* — John Walters
(74) *Attorney, Agent, or Firm* — Westman, Champlin & Koehler, P.A.; Donika P. Pentcheva

(57) ABSTRACT

Embodiments of the present disclosure are directed to a wheelbarrow tie rod having a central body that is substantially rectangular and elongated. The tie rod comprises a lower anchor section, which is joined to a first side of the central body, and an upper anchor section, which is joined to the central body on a second side opposite the first side and extending in a second direction on a side opposite the central body. The central body includes a central projection.

19 Claims, 11 Drawing Sheets

(56) References Cited

U.S. PATENT DOCUMENTS

| | | |
|---|---|---|
| 7,000,929 B1 | 2/2006 | Liu |
| D530,879 S | 10/2006 | Iturbide Jimenez et al. |
| 7,232,135 B2 | 6/2007 | Robinson |
| 7,258,231 B1 | 8/2007 | Wertz et al. |
| 7,296,807 B2 | 11/2007 | Zimmerman |
| D588,323 S | 3/2009 | Zimmerman |
| 7,506,878 B2 | 3/2009 | Feick |
| D591,022 S | 4/2009 | Zimmerman |
| D591,023 S | 4/2009 | Zimmerman |
| 7,748,723 B2 | 7/2010 | Iturbide Jimenez |
| 7,775,531 B2 | 8/2010 | Zimmerman |
| 7,866,686 B2 | 1/2011 | Conaway et al. |
| 7,900,939 B2 | 3/2011 | Robinson |
| 7,934,728 B2 * | 5/2011 | Strobel ............... 280/47.21 |
| 8,523,198 B2 | 9/2013 | Albert et al. |
| 8,567,797 B2 | 10/2013 | Westphal |
| 8,752,847 B2 | 6/2014 | Albert et al. |
| 2007/0257456 A1 | 11/2007 | Feick |
| 2008/0265537 A1 | 10/2008 | Lin |
| 2014/0091540 A1 | 4/2014 | Frenkel |

OTHER PUBLICATIONS

Prosecution history of corresponding U.S. Appl. No. 13/901,096 including: Notice of Allowance dated Jun. 24, 2014.

* cited by examiner

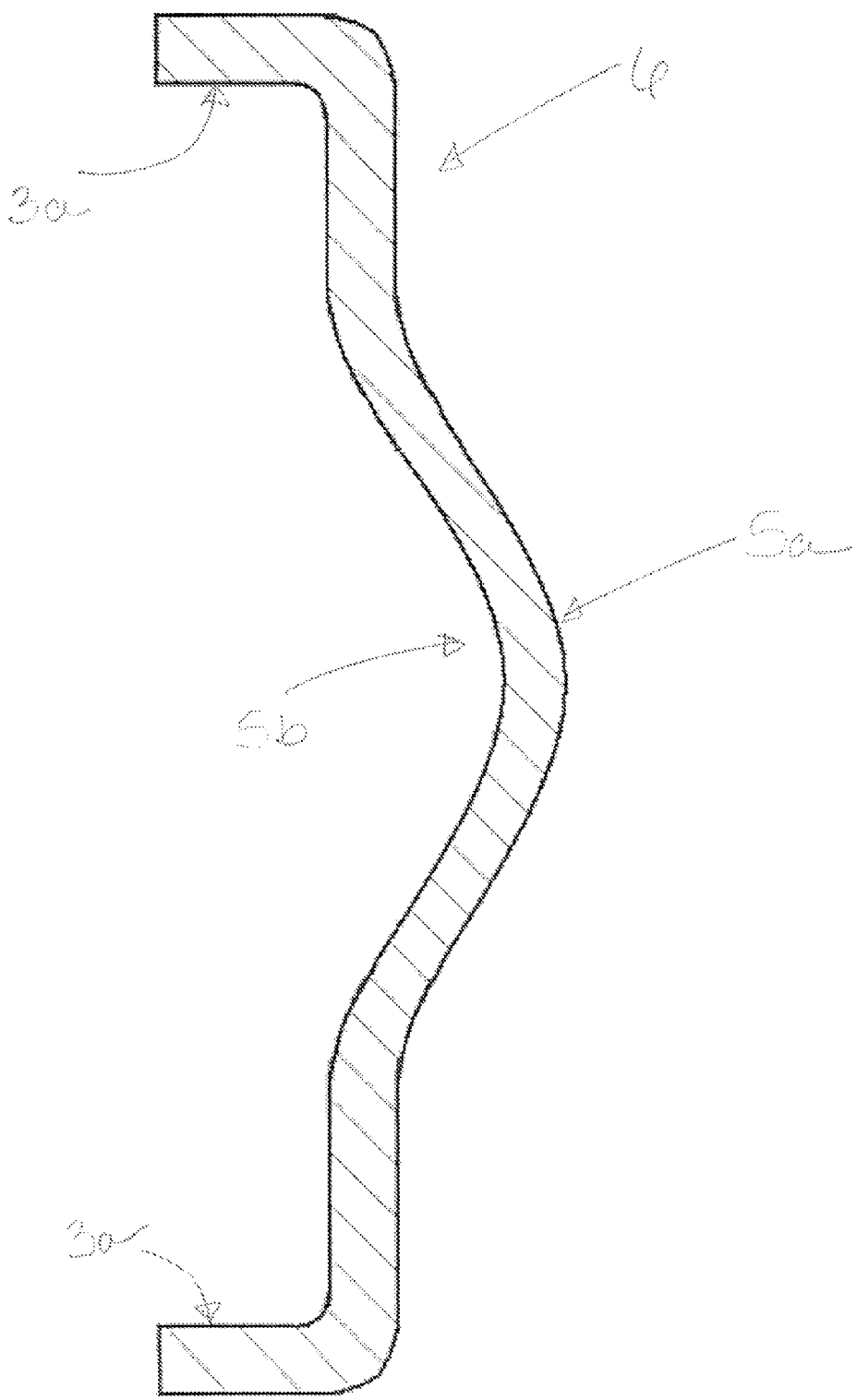

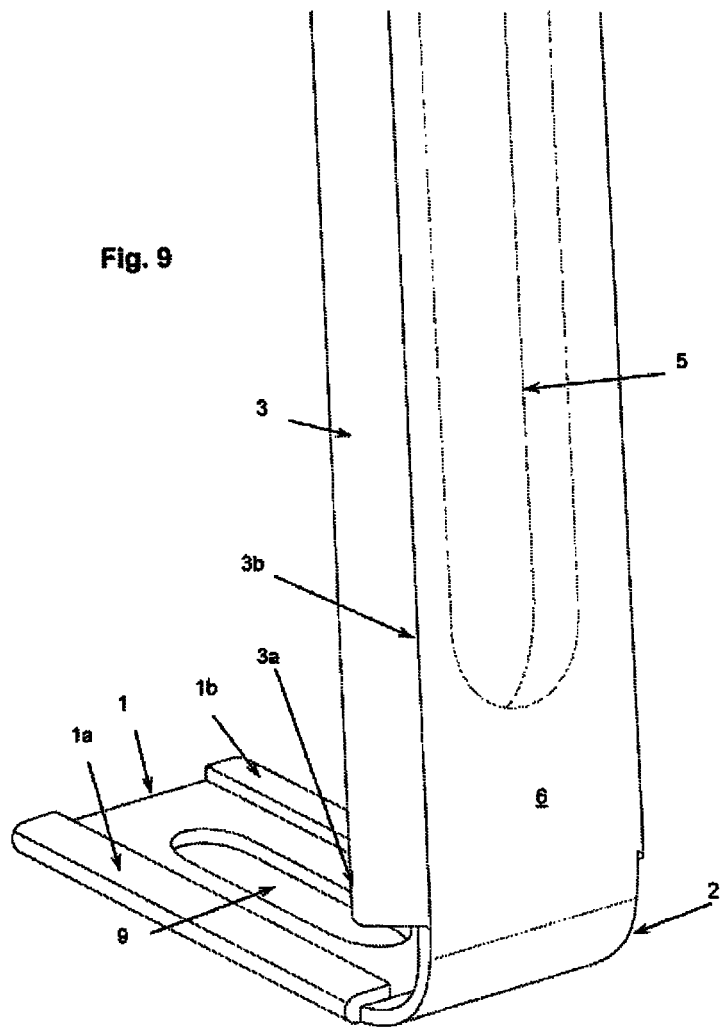

WHEELBARROW TIE ROD

BACKGROUND

The discussion below is merely provided for general background information and is not intended to be used as an aid in determining the scope of the claimed subject matter.

Wheelbarrows have existed for centuries. Tie rods for use with wheelbarrows are also known. This invention generally relates to a strengthened wheelbarrow tie rod of having a frame and a shell at the front of the wheelbarrow.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Embodiments of the present invention relate to strengthening a wheelbarrow by angling, forming and outlining a wheelbarrow tie rod in order to resist a higher load. An aspect of the present disclosure is a wheelbarrow having a substantially "Z"-shaped wheelbarrow tie rod. A further aspect of the present disclosure is a wheelbarrow with a wheelbarrow tie rod having a novel angle incorporated therein. A further aspect of the present disclosure is a wheelbarrow tie rod having a central shaping (or countersink) throughout the tie rod with an edged shape. A further aspect of the present disclosure is a wheelbarrow tie rod which is geometrically shaped for receiving standardized wheelbarrow frames and shells. A further aspect of the present disclosure is providing a wheelbarrow tie rod made from a thin sheet of material. A further aspect of the present disclosure is a wheelbarrow tie rod that has an extending side wall or outline for supporting front slippages of contents out of the wheelbarrow shell and allows the tie rod to have a higher bending strength.

A further aspect of the present disclosure is a wheelbarrow tie rod which includes material buckling in upper and lower anchor zones for resisting higher loads. A further aspect of the present disclosure is providing a wheelbarrow tie rod wherein the tie rod is shaped by means of a shaping die, which is shaped by the following steps: cutting, outlining, shaping (or countersinking) and bending. A further aspect of the present disclosure is a wheelbarrow tie rod which optimizes a raw material used for the manufacturing of the wheelbarrow tie rod, thereby increasing the quality and performance of the tie rod. A further aspect of the present disclosure is a wheelbarrow tie rod which is configured to support additional loads, and in the load end, may lightly slip without breaking.

Other additional advantages can become apparent from the Detailed Description, the Drawings, and the Claims.

BRIEF DESCRIPTION OF THE DRAWINGS

In order to provide a better understanding of aspects of the invention, the following drawings are herein attached:

FIG. 3B is a sectional view of a portion of a central body taken along lines 3B-3B in FIG. 2 with portions removed.

FIG. 9 is a close-up to the lower portion of an embodiment of the wheelbarrow tie rod of the present invention.

DETAILED DESCRIPTION OF ILLUSTRATIVE EMBODIMENTS

Even though illustrative embodiments of the present disclosure are directed to a wheelbarrow having a wheelbarrow tie rod, it should be understood that the present invention is not only limited to a wheelbarrow tie rod as the one shown, but the disclosure may also be used for the construction of other kinds of tie rods, wherein the angles may provide it with technical advantages described herein.

The prior art describes problems that arise during the manufacturing of wheelbarrow tie rods and have existed for centuries. When manufacturing elements of a wheelbarrow, manufacturers usually do not focus on the tie rods that hold a shell of the wheelbarrow to a frame of the wheelbarrow. However, it has been discovered that this point is critical for wheelbarrow users, especially at the moment of discharging contents of the wheelbarrow, because as the wheelbarrow user lifts the wheelbarrow by the handles of the frame (in order to lift the shell, which holds the contents), the point in between the shell and the frame is the point where a high amount of pressure is placed upon the tie rod, and where the tie rod may bend or break.

Figure 1:
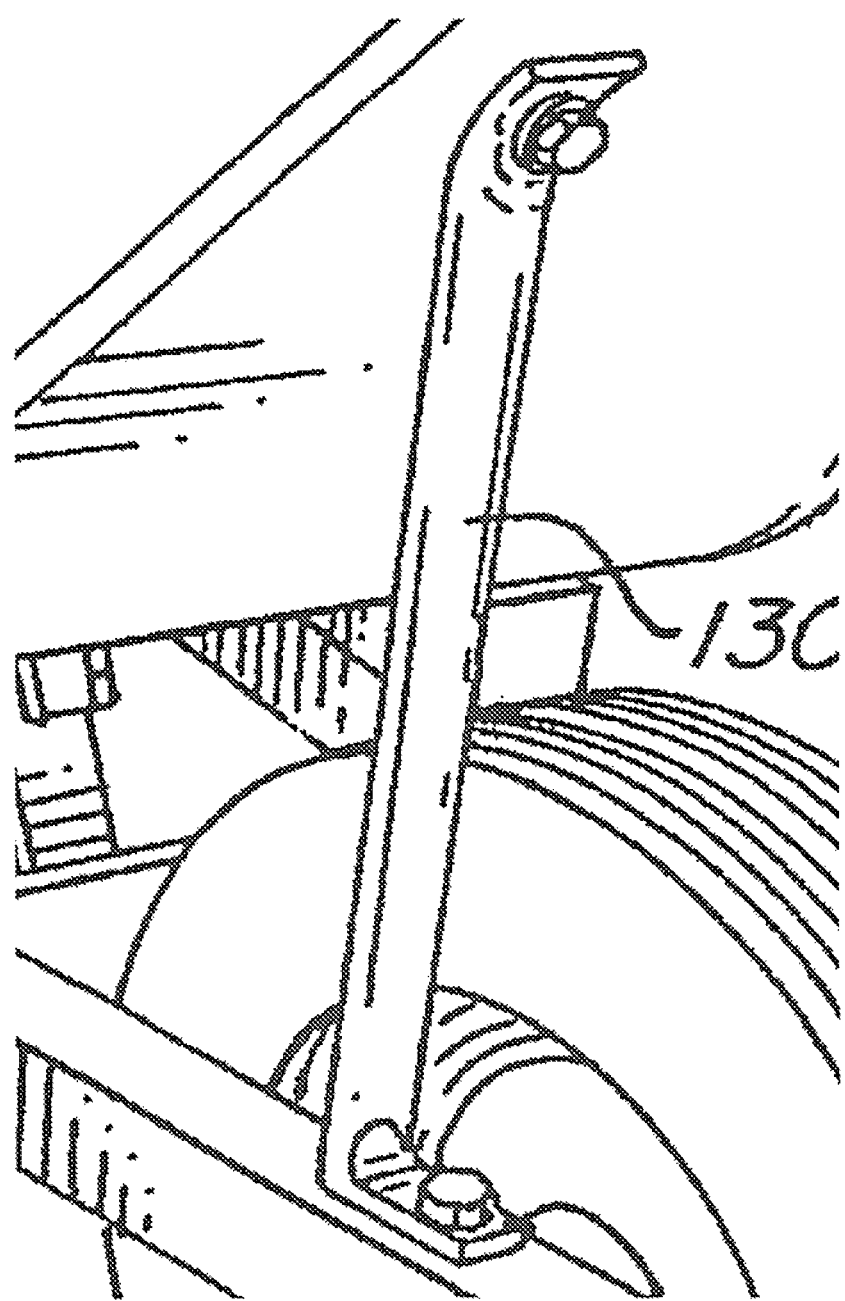
FIG. 1 is a front perspective view of a wheelbarrow tie rod of the prior art.

Wheelbarrow tie rods that have prevailed in the market place appear to be those with totally flat faces and/or "C"-shaped cross-sections, as, for example, the one shown in FIG. 1, which shows a perspective view of a wheelbarrow tie rod (13) of the prior art having a substantially "C"-shaped section. In tie rods of the prior art, as the one shown in FIG. 1, at the moment of holding angles in the same direction (that is, exhibiting an overall "C"-shape from end to end), the stresses are focused on the middle part of the tie rod. Accordingly, the tie rod tends to bend in their middle parts.

As will be shown by way of experimental test results in Tables 1 and 2 below, the prior art tie rods are unable to resist the loads that embodiments of the tie rod disclosed in the present invention are able to resist. The prior art tie rods also have the drawback of having a low resistance to any overweight imposed on the wheelbarrow, particularly when it is considered that one of the highest stresses placed on the tie rod corresponds to the moment during which the user discharges the contents of the wheelbarrow. Usually, that moment happens when the wheelbarrow is turned towards its front end, so as to load and/or empty any contents. Further, the tie rods shown in FIG. 1 are normally manufactured flat along its width, which is usually done by solely bending a sheet used to manufacture the tie rods. The drawbacks of this manufacturing method include a resulting tie rod that has an unnecessarily high weight and a resulting tie rod that is not resistant to any overweight loads or additional stresses when loading or unloading contents in or out of the shell of the wheelbarrow. These and other drawbacks of the prior art will be made apparent in the present disclosure by way of experimental testing (discussed below).

U.S. Pat. No. 7,506,878 discloses a "C"-shaped tie rod (similar to the tie rod shown in FIG. 1) with a lower angle of 90° with respect to the frame and a higher angle that is substantially aligned with the shell surface of the wheelbarrow at an anchor point with no reinforcements. The '878 tie rod does not have a reverse transition angle located at a joint of the tie rod and the frame. In other words, it does not have a support element of the shell that holds the wheel and other, additional elements. As a result, prior art "C"-shaped tie rods, such as the one disclosed in the '878 patent, have a lower load capacity, and thus, have to be manufactured with a higher gauge sheet, which increases their overall weight.

Further, the prior art does not appear to disclose a tie rod formed by an 18-gauge sheet (1.21 mm) that complies with, and overcomes performance tests, and strength and distortion criteria set by industry standards. Further, the prior art does not teach an angle or an outline, nor changes in the shape of the tie rod.

Figure 2:
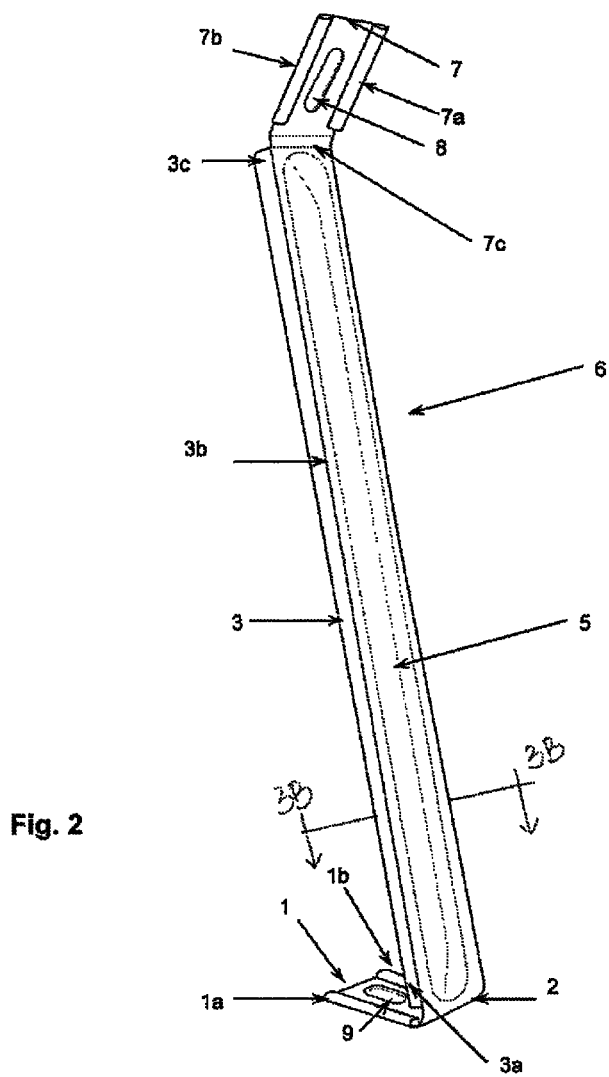
FIG. 2 is a front perspective view of a wheelbarrow tie rod according to an embodiment disclosed in the present application.

In accordance with a first exemplary embodiment of the present disclosure, FIG. 2 illustrates a front perspective view of a wheelbarrow tie rod (14). The wheelbarrow tie rod (14) comprises a central body (6) between opposite ends (6a and 6b), which is substantially rectangular and elongated. The central body (6) includes has a front-facing elongated central projection (5). In one embodiment, central projection (5) has a substantially convex elongated shape that protrudes from a front surface of the central body (6). The central projection (5) can be shaped by means of countersink. In one embodiment, a complimentary elongated recess (5b), for example, concave, to the central projection (5) is formed on a back surface of the central body (6), so as to support higher compression throughout the central body (6). In addition, or in the alternative, central projection (5) can have an elongated edge (5a), a cross-section of which is shown in FIG. 3A.

As also shown in FIG. 2, the central body (6) laterally comprises a pair of side walls or extensions (3) (best shown in FIGS. 5 and 8) that are placed substantially along the central body (6) and form an "L"-shape on each side with respect to the central body (6). The side walls or extensions (3) are perpendicular to the front face of the central body (6), and protrude towards the back part of the central body (6). In one embodiment, the side extensions (3) extend along the length of central body (6), formed as a single unitary body The side extensions (3) have a flap shape and include a stiffening fold (3b) on each side of the pair of the side extensions (3). In an illustrative embodiment, the stiffening fold (3b) is a substantially-rounded buckling. As shown in FIG. 2, the cross-section of the central body (6), in its narrower part, is substantially "C"-shaped in cross-section and has a central projection (5) (best seen in FIGS. 4 and 5). This shape of the central body (6) provides several advantages, one of which is that the "C"-shaped cross-section of the central body (6) provides added strength, which substantially lowers the likelihood that the central body (6) will begin to bend. Referring to FIG. 3A, in case of an extreme load, which can be due to loading or unloading of overweight contents, there may be an undesired amount of additional pressure over an acute lower angle (2) at the front of the central body (6) and a portion (3a) of the side extension (3) proximate the lower angle (2). This additional pressure could cause the acute lower angle (2) to be deformed, except that the side extension (3a) is configured to prevent the further deformation of the acute lower angle (2) by moving toward the front of the wheelbarrow. The side extension (3a) is also configured to serve as a stopper for preventing a higher slippage towards the front of the wheelbarrow. Thus, embodiments of the wheelbarrow tie rod of the present invention advantageously offer a lower slippage or front deformation.

FIG. 2 shows a lower anchor section (1) joined to a first side (6a) of the central body (6) and extending in a direction away from a first side of the central body (6), forming an angle (1c) therewith. Lower anchor section (1) has a substantially rectangular shape, and includes a bore (9), which is shaped as a substantially-rounded rectangle. As shown in the illustrated embodiment, bore (9) can placed in and along the middle of lower anchor section (1). Bore (9) can be formed by combining two congruent semicircles and two parallel segments. The shape of bore (9) has the advantage of being capable to receive different-sized and different-shaped screws for securing the tie rod (14) to the frame of the wheelbarrow (not shown in FIG. 2). Moreover, the shape of bore (9) aids in the adjustment to several kinds of wheelbarrow frames with no need of manufacturing an extra piece for different kinds of frames. Further, lower anchor section (1) includes a pair of material bucklings (1a and 1b) herein on each of the side edges, which are formed by bending a flap of material towards the inner part of the lower anchor section (1) in the inner face. It should be noted that the lower anchor section (1) in its outer face (in other words, the face that attaches to the wheelbarrow frame) is completely flat. As such, it is the inner face, which does not attach to the frame, that includes the pair of material bucklings (1a, 1b). This buckling arrangement allows for higher bending and/or detaching strength.

Similarly, FIG. 2 shows an upper anchor section (7) joined to the central body (6) on a second side (6b) opposite the first side (6a) and extending in a second direction on a second side of the central body (6) opposite the lower anchor section (1). Upper anchor section (7) has a substantially rectangular shape. Upper anchor section (7) includes a bore (8) which is shaped as a substantially-rounded rectangle. As shown in the illustrated embodiment, bore (8) can be placed in and along the middle of upper anchor section (7). Bore (8) can be formed by two congruent semicircles and two parallel segments. The shape of bore (8) has the advantage of being capable to receive different-sized and different-shaped screws for holding the tie rod (14) to the shell of the wheelbarrow. Moreover, the shape of bore (8) aids in the adjustment to different kinds of wheelbarrow shells with no need of manufacturing an extra piece for different kinds of shells. Further, upper anchor section (7) includes a pair of material bucklings (7a and 7b) herein on each of the side edges, which are formed by bending a flap of material towards the inner part of the upper anchor section (7) in the inner face. As with the lower anchor section (1), it should be noted that the upper anchor section (7) in its outer face (in other words, the face that attaches to the wheelbarrow shell) is completely flat. As such, it is the inner face, which does not attach to the shell, that includes the pair of material bucklings (7a, 7b). This buckling arrangement allows for higher bending or detaching strength. As described above with respect to side extension (3a), in case of an extreme load, which can be due to overweight contents or to the discharging of the contents, there may be an undesired amount of additional pressure over an upper angle (7c) at the front of the upper anchor section (7) and the side extension (3c). This additional pressure could cause the acute upper angle (7c) to be deformed, except that the side extension (3c) is configured to prevent or reduce the deformation of the upper angle (7c) by moving toward the front of the wheelbarrow. The side extension (3c) is also configured to serve as a stopper for preventing a higher slippage towards the front of the wheelbarrow. Thus, embodiments of the wheelbarrow tie rod of the present invention advantageously offer a lower slippage or front deformation. The lower anchor section (1) and the upper anchor section (7) extend to the opposite sides of the central body (6). In the embodiment illustrated, side extensions 3a and 3b on each side of the central body (6) can be integral, being formed from a single unitary body so as to extend along the length of the central body (6).

Figure 3:
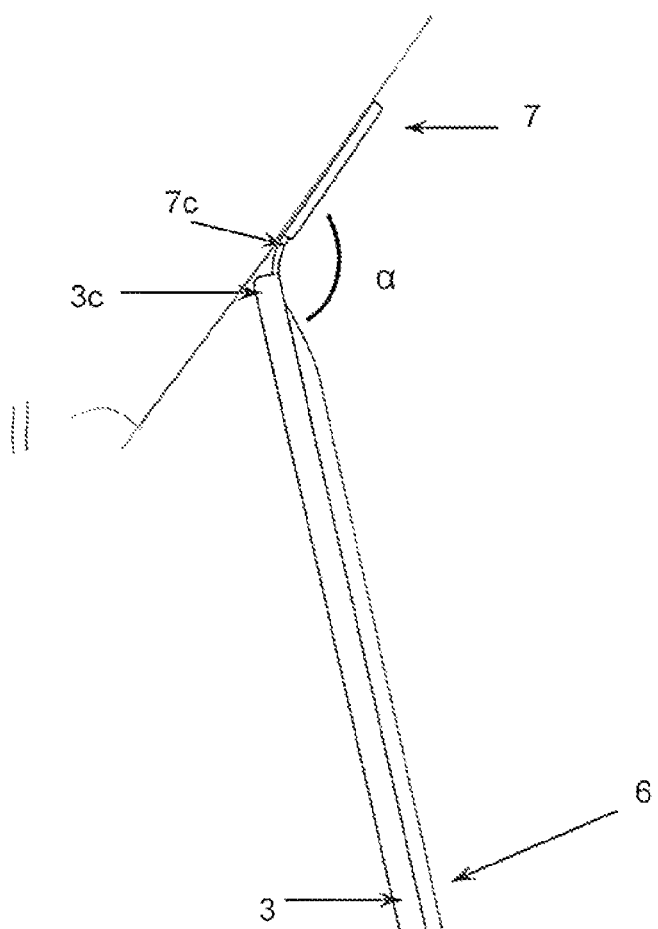
FIG. 3 is a side view of an embodiment of the wheelbarrow tie rod.
Figure 3A:
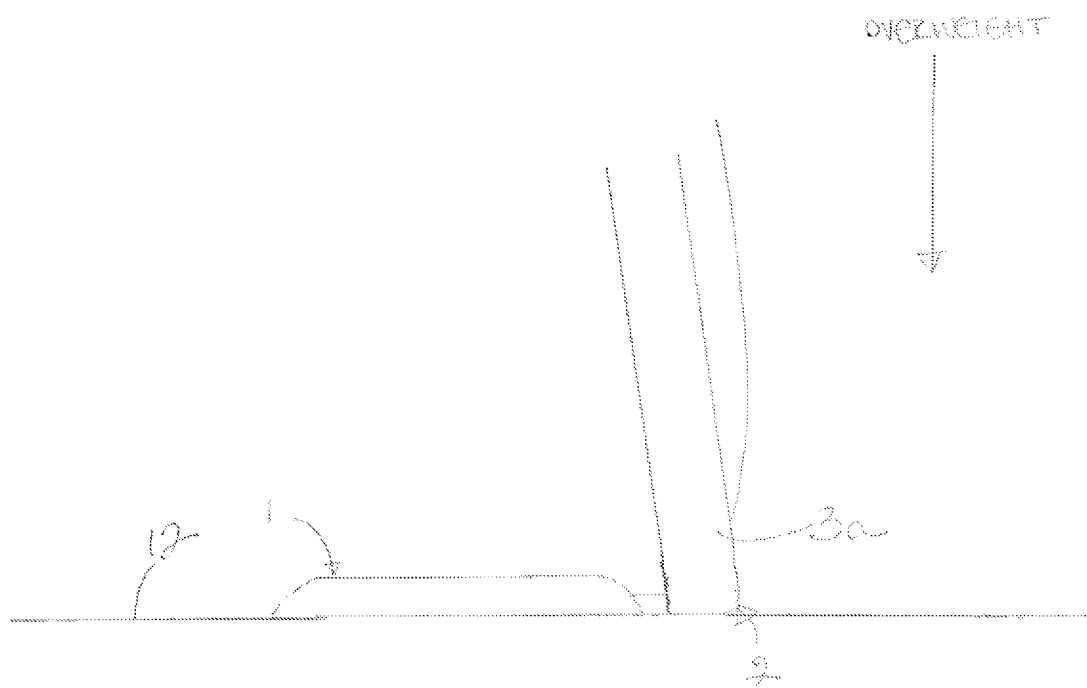
FIG. 3A is a side view of an embodiment of the wheelbarrow tie rod when the wheelbarrow tie rod is subjected to overweight.
Figure 6:
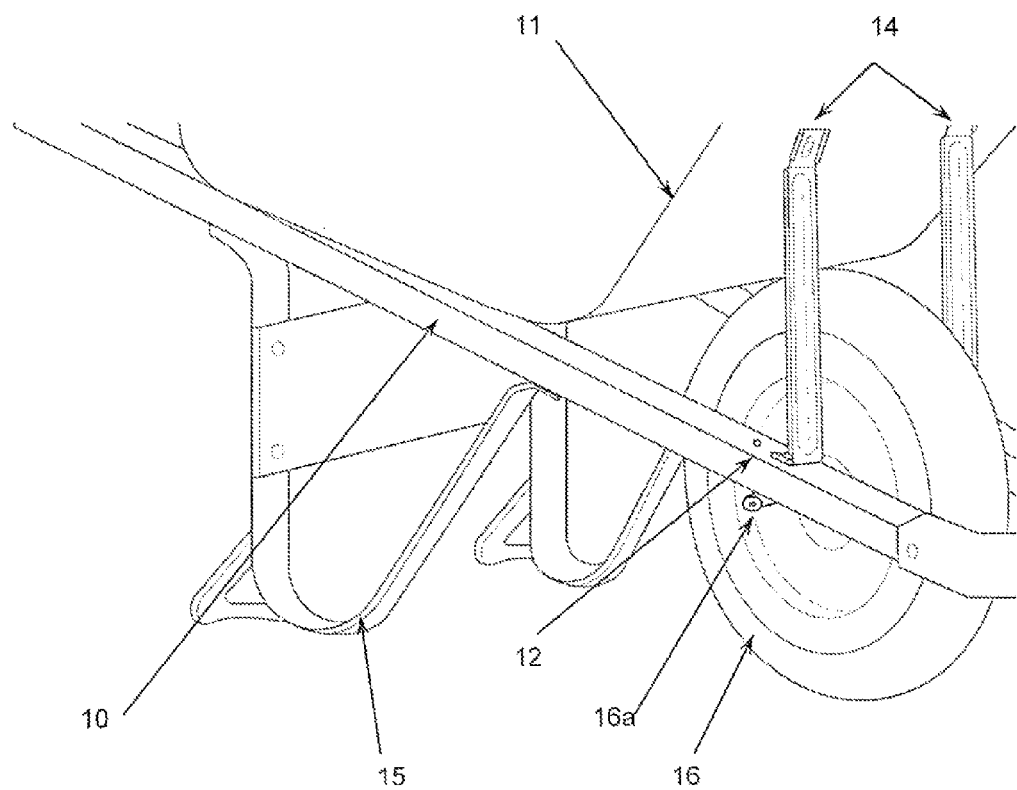
FIG. 6 is a view of an embodiment of the wheelbarrow tie rod as it is secured in the wheelbarrow.
Figure 7:
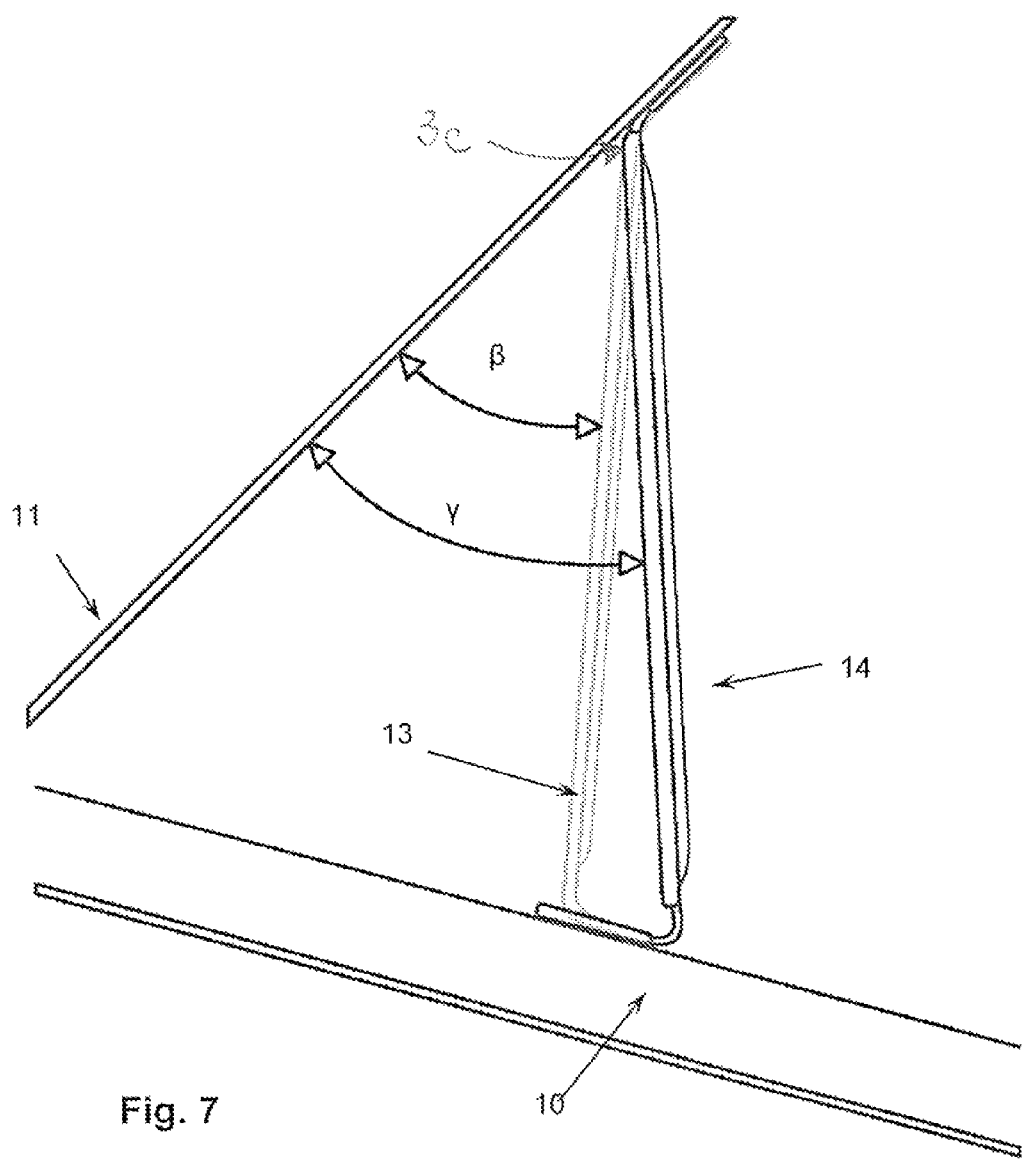
FIG. 7 is a comparison of an embodiment of the wheelbarrow tie rod of the present invention with a wheelbarrow tie rod of the prior art.
Figure 8:
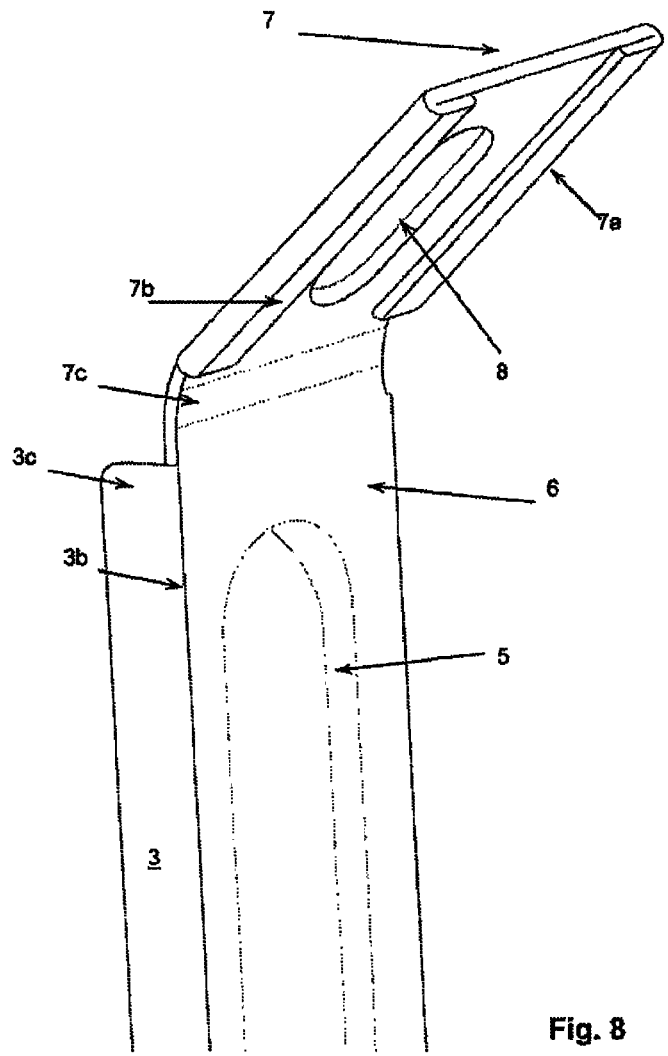
FIG. 8 is a close-up to the upper portion of an embodiment of the wheelbarrow tie rod of the present invention.

FIG. 3 shows a side view of an illustrative embodiment of the wheelbarrow tie rod (14) with the upper anchor section (7) attached to the central body (6) by means of the upper angle (7c). Upper angle (7c) can have an angle ($\alpha$) which can range between 110° and 150°, as having such a range would make it likely that upper anchor section (7) can be attached to a majority of existing shells in the prior art. In one embodiment, upper angle (7c) has an angle ($\alpha$) of 130° and may be coupled to shells, such as wheelbarrow shell (11) shown in FIG. 6. As illustrated in FIG. 7, it should be noted that to make the anchoring to the shell (11) more stable, the upper sections of the side outlines (3c) should be spaced apart from or not contact the shell (11) provided in the outer face of the upper anchor section (7) (that is, the face attached to the wheelbarrow shell but proximate thereto). As also shown in FIG. 3, lower anchor section (1) is attached to the central body (6) by means of a lower angle (2). Lower angle (2) can have an angle ($\theta$) which can range between 55° and 85°, as having such a range would make it likely that lower anchor section (1) can be attached to a majority of existing frames in the prior art. In one embodiment, lower angle (2) has an angle ($\theta$) of 70° and may be coupled in frames, such as frame (10) shown in FIG. 6. As illustrated in FIG. 7, it should be noted that to make anchoring the tie rod (14) to the frame (10) more stable, the lower sections of side outlines (3a) should be spaced apart or not contact the frame (10) that will be provided in the outer face of the lower anchor section (1) (that is, the face attached to the wheelbarrow frame). Close-ups to the upper portion and the lower portion of the tie rod are shown in FIGS. 8 and 9, respectively.

FIG. 3 shows the substantially "Z"-shaped tie rod (14), when tie rod (14) is viewed from a side opposite from that shown in FIG. 3. As shown, angle ($\theta$) is horizontally situated lower than angle ($\alpha$). This is particularly relevant in the embodiment shown in FIG. 3, as angle ($\alpha$) is selected so as to couple to wheelbarrow shell (11) (shown in FIG. 6). As such, angle ($\alpha$) depends on the wheelbarrow shell to which it is to be attached to. On the other hand, angle (A) is selected so as to couple to wheelbarrow frame (10) (shown in FIG. 6). As such, angle (A) depends on the wheelbarrow frame to which it is to be attached. Thus, angles (a) and (A) may have different ranges (as discussed above) in order to obtain a strengthened wheelbarrow tie rod (14) that couples to different types of frames and shells. As shown in FIG. 3, upper anchor section (7) extends upwardly, while the lower anchor section (1) is substantially arranged in a horizontal plane. Further, ends of upper anchor section (7) and lower anchor section (1) extend in opposite directions: upper anchor section (7) extends towards the front of the wheelbarrow (as shown in FIG. 6), whereas lower anchor section (1) extends towards the wheelbarrow shell (11) (as shown in FIG. 6). Some advantages of having such a shape include avoiding the distortion of the tie rod and resisting a higher number of impacts without bending the tie rod.

FIG. 6 shows one embodiment of a wheelbarrow of the present invention having at least two tie rods (14) which are anchored to wheelbarrow shell (11) by way of screws to the shell (11) in its upper part and to the frame (10) in its lower part, further, the wheelbarrow may comprise a pair of side supports (15), a rim (16), a rim shaft (16a). The tie rods (14) of this invention are comprised in the rim fitting area (12), at the same time, the tie rods (14) may be coupled to the frame by the screws that hold the rim shaft FIG. 7 illustrates a comparison of the tie rod of the present invention with a tie rod of the prior art. The two tie rods are shown overlapping each other, wherein the tie rod (14) represents the tie rod of the present invention and tie rod (13) represents the tie rod of the prior art (13). In FIG. 7, it is noted that prior art tie rod (13) has an angle ($\beta$) formed between prior art tie rod (13) and shell (11), while the tie rod (14) has an angle ($\gamma$) that is formed between the tie rod (14) and the shell (11). As can be seen, angle ($\beta$) is smaller than angle ($\gamma$). Further, tie rod (14) of the present invention advantageously has an angle that is higher than the one of the prior art, which is associated with a higher distortion strength, as will be shown below in Tables 1 and 2.

Figure 4:
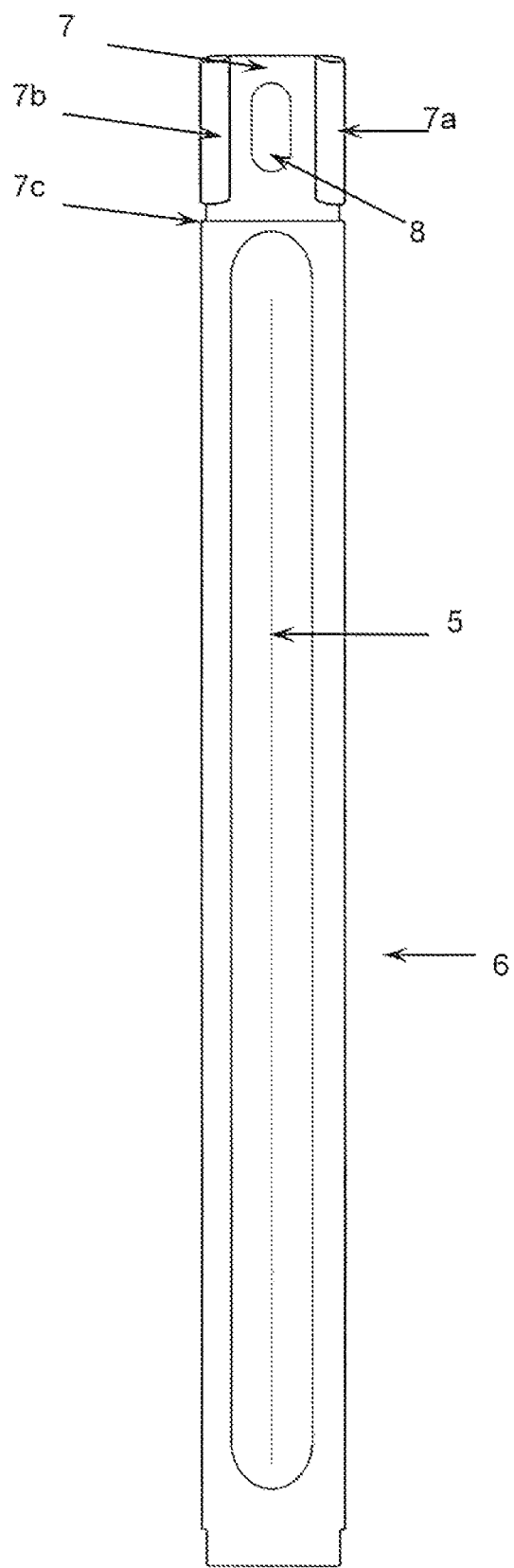
FIG. 4 is a front view of an embodiment of the wheelbarrow tie rod.
Figure 5:
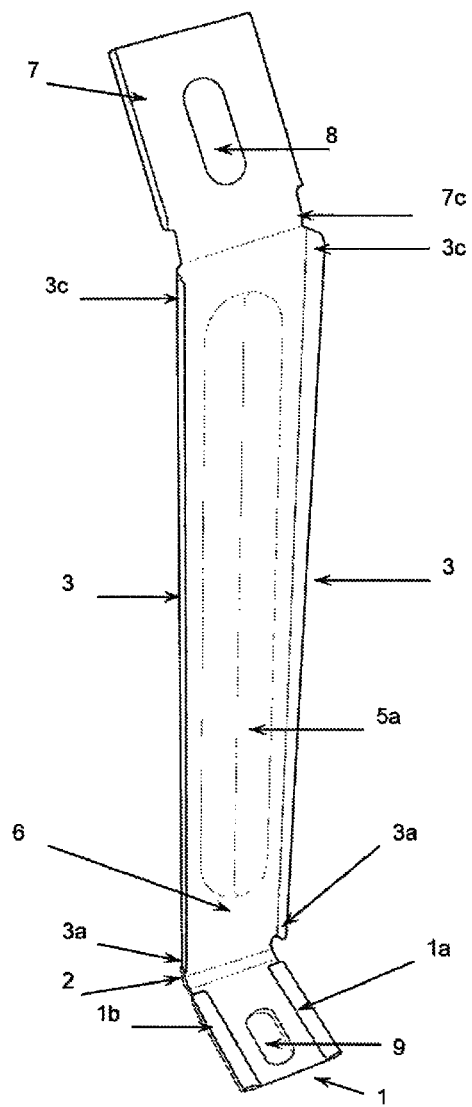
FIG. 5 is a rear perspective view of an embodiment of the wheelbarrow tie rod.

It should be noted that, in one embodiment, central projection (5) is provided substantially along the front face of the central body (6) almost reaching the upper angle (7c) and lower angle (2) as shown in FIGS. 2, 3, 4. Nevertheless, same may end before reaching the upper angle (7c) and lower angle (2) as shown in FIG. 9. The embodiment of the central projection (5) as the one shown in FIG. 9, may be used for wheelbarrows that do not require loading extreme weights, but do require a strengthened tie rod.

The steel for manufacturing the tie rod is a commercial carbon steel sheet AISI 1010. Said sheet can be provided in 38 mm width coils weighting 250 kg. For the tie rod construct, the raw material is provided to the press through a servo-controlled feeder, which provides the exact amount of material to the shaping die; the machine that manufactures the piece is a type "C" mechanical press with a capacity of 60 Tons that works with a rate of 40 pounds/minute. The set of tools that is assembled in the press is a progressive 3-stage shaping die from which finished piece comes out.

In an embodiment, the tie rod of this invention can use an 18 gauge as front tie rods in lightweight wheelbarrows, while gauge 15 can be used as front tie rods in professional wheelbarrows (rough use).

The present description has been made citing different parts of the front tie rod, nevertheless, the same is typically integrally formed by a single unitary piece.

As shown in Tables 1 and 2 below, estimations and impact tests were performed regarding the modalities referred to in this disclosure, as compared to a "C"-shaped in cross-section wheelbarrow tie rod of the prior art against the present tie rod. The impact test consists of a staggered ramp wherein each stair has a height of 6 inches (15.24 centimeters). The first step comprises raising the ramp with the wheelbarrow. The second step comprises transferring the wheelbarrow towards a downwards stair and dropping the wheelbarrow with the weight onwards (first impact). The third step is transferring the wheelbarrow to the next downwards stair and dropping the wheelbarrow with the weight onwards (second impact). The fourth step comprises transferring the wheelbarrow to the next downwards stair and dropping the wheelbarrow with the weight onwards (third impact). The fifth step is completing steps 1 through 4 until achieving 150 impacts, or preferably, until the wheelbarrow fails or becomes inoperable.

Table 1 presents the results obtained in the first impact test of a wheelbarrow with wood frame, with a 160 kg heaping load. The distortion of the tie rod was measured laterally.

TABLE 1

Impact test in a wheelbarrow with wood frame

| Front tie rod | Gauge | Impacts | Distortion | Remarks |
|---|---|---|---|---|
| "C" shape | 12 | 150 | 2 cm | The failure was produced after 135 impacts |
| "Z" shape | 15 | 150 | 0 cm | The frame had a light distortion at impact 135 |

Table 2 presents the results obtained in the first impact test of a wheelbarrow with tubular frame, with a 160 kg heaping load. The distortion of the front tie rod was measured.

TABLE 2

Impact test in a wheelbarrow with tubular frame

| Front tie rod | Gauge | Impacts | Distortion | Remarks |
|---|---|---|---|---|
| "C" shape | 12 | 150 | 4 cm | The failure was produced after 135 impacts |
| "Z" shape | 15 | 150 | 0 cm | The frame had a light distortion at impact 135 |

In the performed tests, it may be observed that the tie rod of the embodiments herein described manufactured in a lower gauge, had a lower distortion for both types of frames. In conclusion, it is clear the way in which, notwithstanding the fact that the tie rod has a lower thickness, the "Z"-shaped tie rod resists a higher amount of impacts before failing or not failing.

Based on the above disclosure, certain embodiments and details have been described in order to illustrate the present invention, and it will be evident for those skilled in the art that variations and modifications may be made without departing from the scope of the present invention.

The invention claimed is:

1. A wheelbarrow tie rod, comprising:
a central body which is substantially rectangular elongated;
a lower anchor section joined to a first side of the central body and extending in a direction away from the first side of the central body, forming an upper angle therewith, and having a substantially-rectangular shape;
an upper anchor section joined to the central body on a second side opposite the first side and extending in a second direction on a second side of the central body opposite the lower anchor section, and having a substantially-rectangular shape; and
a pair of side extensions located substantially along the central body, wherein each of side extension forms an "L" shape when connected to the central body, being perpendicular to the first side of the central body, and extending in a direction similar to the lower anchor section.

2. The wheelbarrow tie rod of claim 1, wherein the central body comprises a central projection.

3. The wheelbarrow tie rod of claim 2, wherein the central projection comprises a front side having a convex shape and a rear side having a concave shape.

4. The wheelbarrow tie rod of claim 1, further comprising a pair of material bucklings formed as overlapping flaps of material, each extending toward an inner part of the lower anchor section.

5. The wheelbarrow tie rod of claim 1, further comprising a pair of material bucklings formed as overlapping flaps of material, each extending toward an inner part of the upper anchor section.

6. The wheelbarrow tie rod of claim 1, wherein the upper angle is between 110° and 150°.

7. The wheelbarrow tie rod of claim 1, wherein the lower angle is between 55° and 85°.

8. A wheelbarrow, comprising:
a wheelbarrow shell configured to hold contents in the wheelbarrow;
a wheelbarrow frame connected to and supporting the wheelbarrow shell;
a pair of wheelbarrow tie rods connecting the wheelbarrow shell and the wheelbarrow frame, each wheelbarrow tie rod comprising:
a central body having a substantially rectangular elongated shape;
a lower anchor section joined to a first side of the central body, comprising a substantially-rectangular shape and forming a lower angle with the central body; and
an upper anchor section joined to the central body on an end opposite the first side, comprising a substantially-rectangular shape and forming an upper angle upon being attached to the central body;
wherein the lower anchor section and the upper anchor section extend in opposite directions from each other; and
upper side extensions and lower side extensions disposed on each side of the central body and adapted to inhibit deformation of the wheelbarrow.

9. The wheelbarrow of claim 8, wherein each lower anchor section extends rearwardly in a direction towards a front-facing surface of the wheelbarrow shell, and wherein the each upper anchor section extends upwardly along the front-facing surface of the wheelbarrow shell.

10. The wheelbarrow of claim 9, wherein the central body comprises a central projection, the central projection comprising a front side, facing away from the wheelbarrow shell having a convex shape, and a rear side facing toward the wheelbarrow shell having a concave shape.

11. The wheelbarrow of claim 10, wherein the central projection comprises an elongated edge.

12. The wheelbarrow of claim 9, wherein the upper angle is between 110° and 150°.

13. The wheelbarrow of claim 9, wherein the lower angle is between 55° and 85°.

14. The wheelbarrow of claim 8, wherein the upper side extensions are configured to extend toward the wheelbarrow shell, the upper side extensions disposed at least proximate to the wheelbarrow shell.

15. The wheelbarrow of claim 14, wherein the upper side extensions are configured such that when the wheelbarrow is overloaded, the upper side extensions will inhibit further deformation of the upper anchor section by contact with the wheelbarrow shell.

16. The wheelbarrow of claim 8, wherein the lower side extensions are configured to extend toward the wheelbarrow frame, the lower side extensions disposed at least proximate to the wheelbarrow frame.

17. The wheelbarrow of claim 16, wherein the lower side extensions proximate to the lower anchor section are configured such that when wheelbarrow is overloaded, the lower side extensions will inhibit further deformation of the lower anchor section by contact with a portion of the lower anchor section attached to the wheelbarrow frame or the wheelbarrow frame.

18. The wheelbarrow of claim 8, wherein the wheelbarrow tie rod includes:
  upper side extensions on each side of the central body, extending toward the wheelbarrow shell and disposed at least proximate to the wheelbarrow shell, wherein the upper side extensions are configured such that when the wheelbarrow is overloaded, the upper side extensions will inhibit further deformation of the upper anchor section by contact with the wheelbarrow shell, and
  lower side extensions on each side of the central body, extending toward the wheelbarrow frame and disposed at least proximate to the wheelbarrow frame.

19. The wheelbarrow of claim 18, wherein the upper side extensions and the lower side extensions along the length of central body, formed as a single unitary body.

* * * * *